Sept. 28, 1971  H. TRIPPTRAP  3,608,136
EXTRUSION HEAD WITH RING NOZZLE OF ADJUSTABLE WIDTH
ALONG A PORTION OF CIRCUMFERENCE
Filed Sept. 6, 1968  2 Sheets-Sheet 1

Inventor:
Hans Tripptrap,

By Ernest A. Marmorek,
His Attorney.

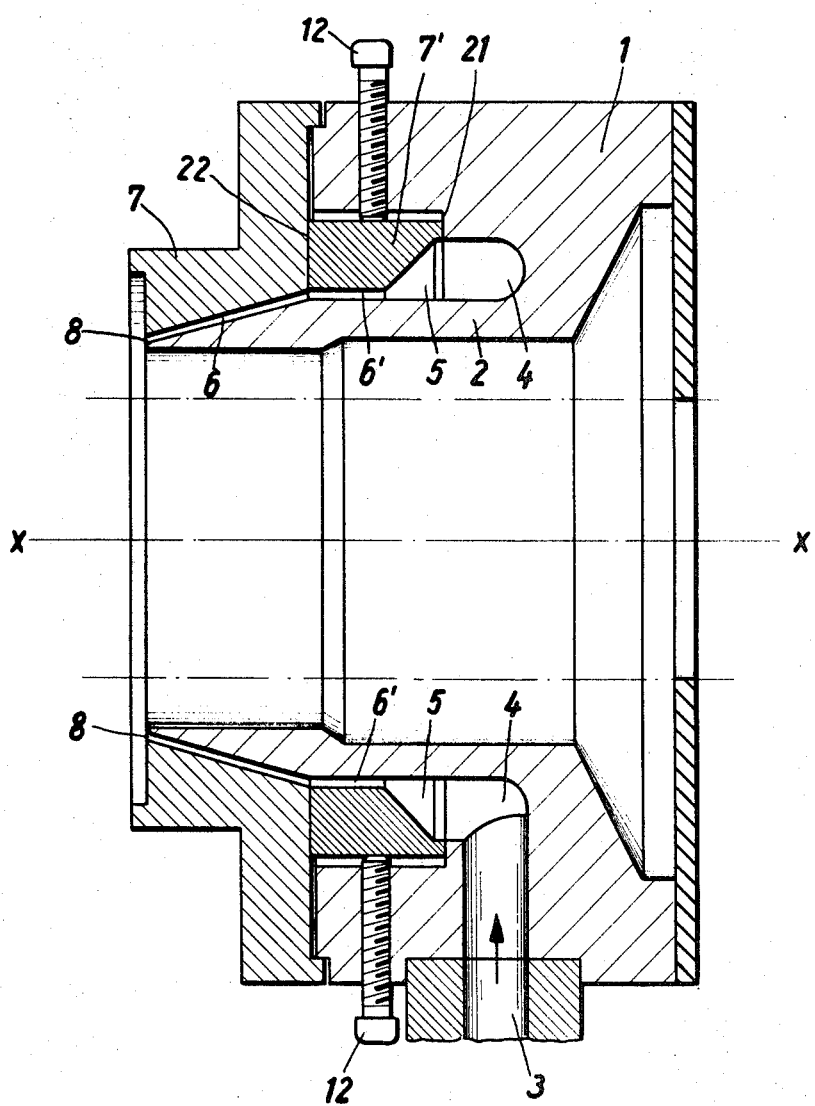

United States Patent Office 3,608,136
Patented Sept. 28, 1971

3,608,136
EXTRUSION HEAD WITH RING NOZZLE OF ADJUSTABLE WIDTH ALONG A PORTION OF CIRCUMFERENCE
Hans Tripptrap, Dusseldorf, Germany, assignor to Mannesmann Aktiengesellschaft, Dusseldorf, Germany
Filed Sept. 6, 1968, Ser. No. 757,941
Claims priority, application Germany, Sept. 8, 1967, P 17 04 850.9
Int. Cl. B29f 3/00
U.S. Cl. 18—13H    3 Claims

ABSTRACT OF THE DISCLOSURE

An extrusion head has a casing with a ring nozzle that forms a part of an annular space between the forward end of a mandrel and a surface in the casing. The width of a portion of the circumference of the annular space is adjustable, thereby to vary the thickness of the hollow extruded material encasing an elongated workpiece.

---

Figure 1:
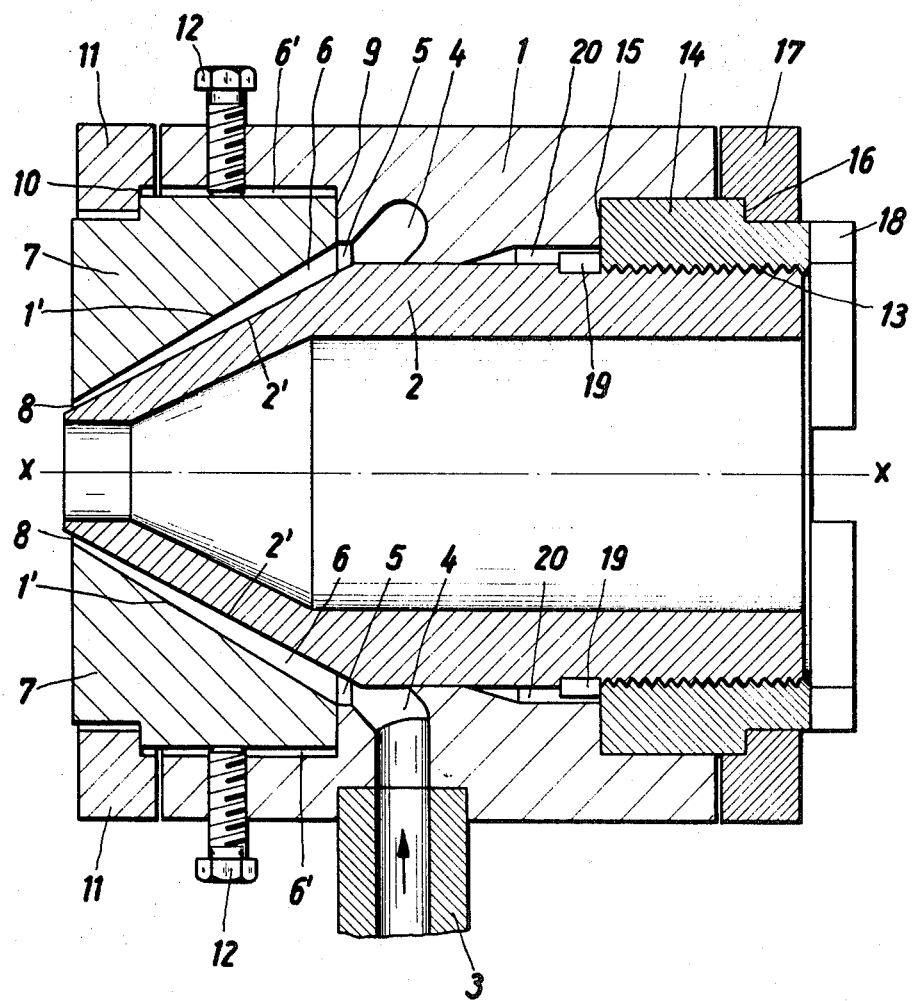

The invention relates to an extrusion head with a ring nozzle for the extrusion of hollow shapes of thermoplastic synthetic material, particularly for encasing elongated workpieces such as tubes. The plasticized synthetic material is fed to the casing of the extrusion head through one or more inlets. These inlets terminate in a toroid chamber that is defined between an internal surface of the casing and an internal surface of a centrally positioned mandrel. The free end of the mandrel extends into the nozzle end portion of the casing, and defines therewith an annular space that determines the width of the hollow shape of the material.

In extrusion heads of this type there is sometimes experienced that the wall thickness of the hollow shape on the tubular workpiece is not uniform throughout the cross section. The reasons for this non-uniformity may be due either to a non-uniform feeding of the plastic material, or to different flow resistances against the equal distribution of the synthetic material during its path from the inlets, through the toroid chamber and the annular nozzle space. Thus, for instance, the wall of the tube or hose may have a greater thickness at the point of the annular space that is close to the lateral inlet, as compared to a point space apart further from an inlet, because the plastic mass may be flow faster at the first point than at the second.

It is accordingly among the principal objects of the invention to provide an extrusion head having a ring nozzle that provides for adjustment of the width of a portion along the circumference of at least a part of the annular space.

It is another object of the invention to provide for such an adjustment by varying the position of the nozzle end portion relative to the center of the extrusion head.

It is a further object of the invention to provide such an extrusion head wherein the adjusting is carried out along a portion of the annular space by a movable ring that is disposed adjacent the stationary nozzle end portion.

Further objects and advantages of the invention will be set forth in part in the following specification and in part will be obvious therefrom without being specifically referred to, the same being realized and attained as pointed out in the claims hereof.

For a fuller understanding of the nature and objects of the invention, reference should be had to the following detailed description, taken in connection with the accompanying drawings, in which:

FIG. 1 is a fragmentary central sectional view of an extrusion head in accordance with an embodiment of the invention; and FIG. 2 is a fragmentary sectional view, similar to FIG. 1, but embodying a modification.

In carrying the invention into effect in the embodiments which have been selected for illustration in the accompanying drawings and for description in this specification, and referring now particularly to FIG. 1, there is provided a casing 1 of an extrusion head. A hollow mandrel 2 is disposed centrally of the axis X—X of the casing 1. The plasticized synthetic thermoplastic material is fed, by means of a supply pipe 3 into the inlet of a toroid chamber 4 that is formed between the casing 1 and the mandrel 2. Adjacent the toroid chamber 4, there is provided an annular chamber 5 that communicates with the toroid chamber 4, and on the other side of the annular chamber 5 and communicating therewith there is defined an annular space 6. The annular space 6 is formed between the tapering external surface 2' of the mandrel 2 and the internal surface 1' of a part 7 of the casing 1.

The said part 7 is formed in the embodiment of FIG. 1 as a nozzle end portion connected to the casing 1 and is movable relative thereto with regard to the axis X—X. The internal surface 1' of the nozzle end portion 7 has a larger taper than the external surface 2' of the mandrel 2, so that the annular space 6 tapers towards the exit opening 8. The nozzle end portion 7 is held between opposite faces 9 and 10 on the interior of the casing 1, the face 10 forming part of a ring 11 that is secured to the casing 1. The faces 9 and 10 hold and guide the nozzle end portion 7 when it is moved at right angles to the axis X—X. In order to adjust the position of the nozzle end portion 7 radially, two set screws 12 are provided. A play 6' is provided for permitting the eccentric adjustment of the nozzle end portion 7. By this eccentric adjustment, the width of the annular space, as viewed about the circumference thereof, may be varied.

If it is found during the extrusion process, that the synthetic material flows faster, for instance in the lower portion (in respect of FIG. 1) of the annular space 6, than in the upper portion, the operator will adjust the nozzle end portion 7 by operating the set screws 12 in such a manner that the lower internal surface of the nozzle end portion 7 will be closer to the surface 2' of the mandrel 2, while at the same time the upper surface of the nozzle end portion 7 will be spaced further apart from the mandrel surface 2'. By the thus produced increase in the flow resistance in the lower portion of the annular space, and the decrease in the flow resistance of the upper part of the annular space 6, the flow of the synthetic material in the nozzle will again be uniform, and the coating extruded from the exit 8 will put a coating of uniform thickness throughout the circumference onto the tube that emerges frontwardly (to the left, FIG. 1) from the interior of the mandrel 2 out of the extrusion head.

For regulating the coat thickness in its entirety, namely throughout the entire circumference, the mandrel 2 is disposed axially movably in the casing 1. The mandrel 2 carries near its rear end an external thread 13 that engages the internal thread of an adjusting nut 14. The nut 14 is rotatable about the axis X—X but is held axially immovably on the front by the shoulder 15 of the casing 1, and on the rear by the shoulder 16 of a ring 17 that is secured, for instance by screw connections, to the casing 1. The rotation of the nut 14 is carried out by means of an extension 18 that projects rearwardly from the casing 1. The mandrel 2 is restrained from rotating about the axis X—X, by means of adjusting springs 19 that are disposed in axial elongated grooves 20 of the internal surface of the casing 1.

In the modification of FIG. 2, the nozzle end portion 7 is secured immovably to the casing 1 of the extrusion head. A ring 7' is disposed rearwardly of the nozzle end portion 7, and is held and guided by a surface 22 of the nozzle end portion 7 and a surface 21 in the casing 1. The ring 7' is movable radially of the axis X—X to change thereby a portion of the circumference of a part 6' of the annular space 6. As best shown in FIG. 2, the part 6' may be a cylindrical annular space portion rather than a tapered annular space.

Set screws 12 are provided for carrying out the aforesaid adjustment. The plasticized thermoplastic synthetic material is again supplied through the conduit 3 to the inlet and therefrom into the toroid chamber 4 and thence into the annular chamber 5 and from there into the portion 6' and thence into the remainder of the annular space 6, and exits through the nozzle opening 8.

The mandrel 2 of the modification of FIG. 2, however, is not made adjustable axially. It is, instead, formed in one piece integrally with the casing 1. The nozzle end portion 7 is releasably secured to the casing 1, for instance by a screw connection.

I wish it to be understood that I do not desire to be limited to the exact details of construction shown and described, for obvious modifications will occur to a person skilled in the art.

Having thus described the invention, what I claim as new and desire to be secured by Letters Patent is as follows:

1. An extrusion head having a ring nozzle, for use in receiving plasticized thermoplastic synthetic material and extruding the thermoplastic material in hollow shape particularly for encasing elongated workpieces such as pipes or hoses, comprising in combination a casing including a wall defining inlet means for said plasticized material, said casing comprising a mandrel integrally molded with the casing in one piece and centrally disposed in said casing and having a front portion, a toroid chamber defined between an internal surface in said casing and an external surface of said mandrel and communicating with said inlet means, a nozzle end portion formed in said casing, said front portion of said mandrel projecting into said nozzle end portion, said mandrel defining with said nozzle end portion an annular space including the ring nozzle opening at the front of the casing, and mechanical adjusting means operable for varying the width of at least a portion along the circumference of at least a part of said annular space, an annular chamber disposed adjacent and communicating with said toroid chamber and forming a part of said annular space, said nozzle end portion comprising a part connected to said casing and being fixed relative to the casing, and a ring part movable radially relative to the longitudinal axis of the casing and disposed adjacent said annular chamber, thereby adjusting eccentrically the widths of a portion of the circumference of at least a part of said annular chamber.

2. An extrusion head, as claimed in claim 1, said nozzle end portion comprising a ring movable at right angles to the longitudinal axis of the mandrel opposite first and second guide surfaces formed on said nozzle end portion and an internal part of said casing, respectively, holding and guiding said ring, and set screws operable for moving said ring radially of said axis.

3. An extrusion head, as claimed in claim 2, guide surfaces defined inside said casing guiding said ring, and set screws operable for adjusting the position of said ring radially with respect to said axis, said non-adjustable part being releasably connected to said casing for removal when the extrusion operation is interrupted.

References Cited

UNITED STATES PATENTS 2,740,158   4/1956   Brown    18—13D
2,859,476  11/1958   Lainson   18—13D H. A. KILBY, JR., Primary Examiner U.S. Cl. X.R.

18—13D, 14V